United States Patent
Barbour et al.

(10) Patent No.: US 10,769,884 B2
(45) Date of Patent: *Sep. 8, 2020

(54) ZERO WEIGHT ARTICULATING ACCESS DOOR

(71) Applicant: ARISTOCRAT TECHNOLOGIES AUSTRALIA PTY LIMITED, North Ryde, NSW (AU)

(72) Inventors: Timothy Francis Barbour, Las Vegas, NV (US); Dominic S. Biondo, Las Vegas, NV (US)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,957

(22) Filed: Dec. 18, 2019

(65) Prior Publication Data
US 2020/0126351 A1    Apr. 23, 2020

Related U.S. Application Data

(63) Continuation of application No. 15/721,012, filed on Sep. 29, 2017, now Pat. No. 10,521,998.

(51) Int. Cl.
G07F 17/32    (2006.01)
G06F 1/16    (2006.01)

(52) U.S. Cl.
CPC ........ *G07F 17/3216* (2013.01); *G06F 1/1601* (2013.01); *G07F 17/3213* (2013.01)

(58) Field of Classification Search
CPC ......... A63F 1/12; A63F 1/14; A63F 2001/005
See application file for complete search history.

(56) References Cited

U.S. PATENT DOCUMENTS

| | | | |
|---|---|---|---|
| 6,386,613 | B1 | 5/2002 | Vader |
| 9,936,593 | B2 | 4/2018 | Deily et al. |
| 10,521,998 | B2 * | 12/2019 | Barbour ................ G06F 1/1601 |
| 2001/0039762 | A1 | 11/2001 | Giovannetti |
| 2005/0218383 | A1 | 10/2005 | Hirtsiefer et al. |
| 2006/0070210 | A1 | 4/2006 | Amdahl et al. |
| 2007/0124893 | A1 | 6/2007 | Brustle et al. |
| 2008/0216289 | A1 | 9/2008 | Salice |
| 2009/0321430 | A1 | 12/2009 | Jeong |
| 2016/0302314 | A1 | 10/2016 | Bae et al. |
| 2016/0343204 | A1 | 11/2016 | Maher et al. |
| 2017/0053482 | A1 | 2/2017 | Ho |
| 2017/0061730 | A1 | 3/2017 | Ho et al. |
| 2018/0053373 | A1 | 2/2018 | Goldstein et al. |
| 2018/0081391 | A1 | 3/2018 | Mittler et al. |

OTHER PUBLICATIONS

AU Examination Report in AU Application No. 2018204322, dated Mar. 27, 2019. 7 Pages.

* cited by examiner

*Primary Examiner* — Jay Trent Liddle
*Assistant Examiner* — Alex P. Rada, II
(74) *Attorney, Agent, or Firm* — Armstrong Teasdale, LLP

(57) ABSTRACT

A weightless articulating door mount for a gaming machine is disclosed. The weightless articulating door mount has a four link mechanism and a cam. A biasing mechanism interacts with the weightless articulating door mount through the cam and provides a uniform force counteracting the weight of the door/monitor. With the door/monitor effectively weightless, the door may be opened and will remain in place absent any further disturbance.

20 Claims, 15 Drawing Sheets

ZERO WEIGHT ARTICULATING ACCESS DOOR

CROSS-REFERENCE TO RELATED APPLICATIONS

This application is a continuation application of U.S. patent application Ser. No. 15/721,012, filed Sep. 27, 2017, the entire contents and disclosure of which is hereby incorporated by reference in its entirety.

BACKGROUND

The subject matter of the present disclosure relates to a door mount, and more particularly, to a gaming machine having an articulating door mount with a zero effective weight door.

In the casino gaming industry, the interior of gaming machines is secured to prevent unauthorized modification, but must be accessible to allow authorized maintenance and service. An access door is typically provided to allow access to each component within the gaming machine. Modern gaming machines use video monitors to interact with a game player and provide an immersive environment. In many gaming machines the monitors are placed on the access door and are designed to be a main point of entry into a gaming cabinet. As screen technologies advance, monitors sizes increase and the size and weight of the door increases as well.

In most cases, these access doors are opened by rotating on a hinge point. For example they may swing horizontally, or rotate vertically from a top or bottom hinge. The doors typically include a conventional linear spring push such as a strut to assist opening the access door to access the interior of the cabinet. The linear spring may hold the door open if it is of sufficient size. However, as monitors and their respective access doors on which they are mounted grow in size, the ability to lift and pivot the loaded access door is becoming more difficult, requiring larger struts. Additionally, gaming machines become prone to tipping as the additional moving weight of the monitor swings away from the gaming machine.

BRIEF DESCRIPTION

In one aspect, an articulating mount for an access door is disclosed. The articulating mount includes a four-link mechanism, a biasing mechanism, and a cam. The four link mechanism has a stationary link configured to couple to a gaming console, a door link opposite the stationary link, the door link is configured to couple to a door, an upper link coupled to the stationary link and the door link, and a lower link coupled to the stationary link and the door link. The biasing mechanism is coupled to at least one link of the four link mechanism. The cam is coupled to a link adjacent the at least one link and provides a position dependent interface for the biasing mechanism to bias the orientation of the door link against a known force.

In another aspect, a gaming console is disclosed. The gaming console includes a cabinet, a door, and at least one mount. The cabinet encloses a processor and a non-transitory memory storing instructions for execution of an electronic game of chance. The door provides access to an interior of the cabinet. The at least one mount secures the door to the cabinet and includes a four-link mechanism, a biasing mechanism, and a cam. The four-link mechanism has a stationary link coupled to the gaming cabinet, a door link opposite the stationary link and coupled to the door, an upper link rotatably coupled to the stationary link and the door link, and a lower link rotatably coupled to the stationary link and the door link. The biasing mechanism is coupled to at least one link of the four link mechanism. The cam is coupled to a link adjacent the at least one link and provides a position dependent interface for the biasing mechanism to bias the orientation of the door link against a known force.

In another aspect, a method of securing a door to a gaming console is disclosed. The method includes rotatably securing a top link to the gaming console; rotatably securing a bottom link to the gaming console; rotatably securing the top link to the door; rotatably securing the bottom link to the door; coupling a cam to one of the top link, the bottom link, the door, and the gaming console; and providing an upward bias to the door through the cam, the cam configured to provide a uniform upward force to the door throughout a working range of the door.

BRIEF DESCRIPTION OF THE DRAWINGS

An exemplary embodiment of the subject matter disclosed will now be described with reference to the accompanying drawings.

DETAILED DESCRIPTION

Exemplary embodiments of the present disclosure relate to an articulating door mount for a gaming machine. The articulating door mount facilitates the use of heavy doors, such as doors containing a large monitor, which may otherwise be too heavy causing difficulty in operation or a tipping hazard. In particular, embodiments of the articulating door mount utilize a four link mechanism, a cam, and a biasing mechanism to bias the four link mechanism against the weight of the door.

Figure 1:
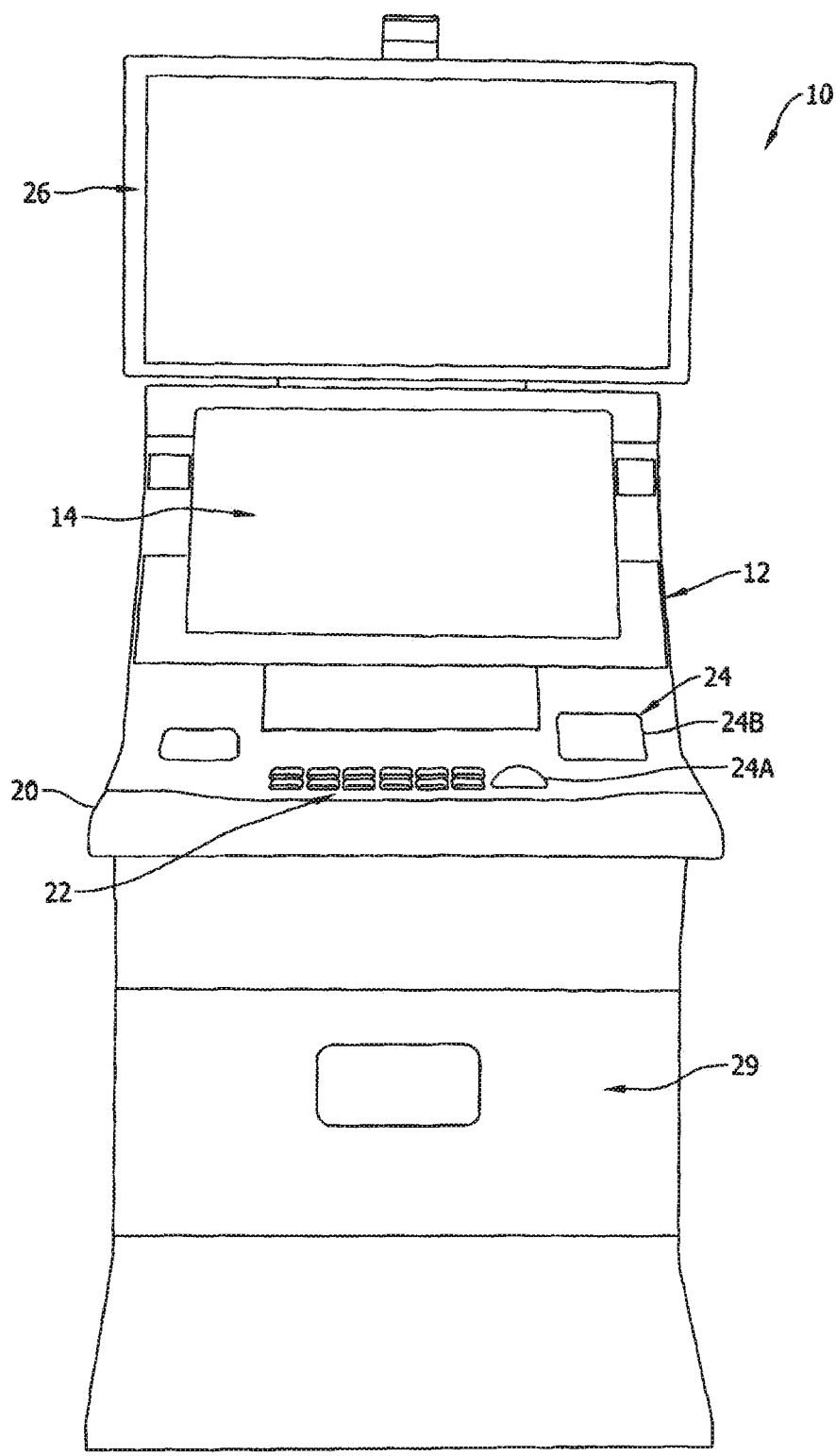
FIG. 1 illustrates a front view of an exemplary gaming machine.

FIG. 1 is a front view of an exemplary gaming machine 10. Gaming machine 10 may include a support structure, housing, console or cabinet 12 that provides support for a plurality of interface units, displays, inputs, controls and other features of a conventional gaming machine. Gaming machine 10 may be configured so that a player can operate it while standing or sitting. Moreover, gaming machine 10 may be positioned on a base or stand, or can be configured as a pub-style table-top game (not shown) that a player can operate while seated. Gaming machine 10 may include varying numbers and styles of cabinets 12, display configurations, and the like without departing from the scope of the present disclosure. Gaming machine 10 includes a display 14. Gaming machine 10 may further include a mid-trim 20, which may house a bank of buttons 22 for enabling a player to interact with gaming machine 10 and/or a credit input mechanism 24.

Gaming machine 10 may also include a player marketing module configured to scan or read a player tracking device, such as, for example a loyalty or player tracking card implemented within a casino as part of a loyalty program. The player tracking device may be in the form of a card, flash drive, and/or any other portable storage medium capable of being read by the reading device. In some embodiments, the player marketing module may be configured to transfer credits between gaming machine 10 and the player tracking device.

Gaming machine 10 may further include a top box 26, which may, in turn, include artwork, such as, for example, artwork depicting one or more pay tables, bonus award information, an upper display (not shown), and/or other game information or imagery. Further artwork and/or information may be provided on a front panel 29 of console 12. A coin tray 30 may be mounted beneath front panel 29 for dispensing cash payouts from gaming machine 10.

Display 14 may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In an exemplary embodiment, display 14 includes a touch-screen or touch-sensitive screen. In various embodiments, display 14 may be of any suitable size and configuration, such as any circular, square, rectangular, or other geometric configuration.

Display 14 may be further configured to provide haptic feedback. Top box 26 may also include a display, which may be of the same or different from display 14.

Display 14 may, in various embodiments, display a game and/or accept game play data from a player. Moreover, display 14 may also display information relating to an interactive game, wager triggering event, or wagering outcome. In an exemplary embodiment, an upper display (not shown) mounted in top box 26 may display any wagering outcome, any suitable secondary game associated or not associated with the interactive game, or any information relating to the interactive games. The upper display may also be configured to accept game play data from a player.

Display 14 may, in addition, serve as digital signage operable to advertise one or more games or other aspects of the gaming establishment. In an exemplary embodiment, gaming machine 10 may also include a credit or fund display 20, which may display a player's current number of credits, cash accumulated, account balance, an original number of credits the player funded the gaming machine with, or an equivalent of any of the aforementioned, and the like. Moreover, in an exemplary embodiment, display 14 may display an amount being wagered or a player's accumulated winnings.

In an exemplary embodiment, and as described in greater detail herein, display 14 may display at least one game or game image, game symbol or symbols, and game indicia, such as any visual representation or exhibition of a movement of objects, including, for example, any mechanical, virtual, or video reels and wheels, dynamic lighting, video images, images of people, characters, places, things and faces of cards, and the like. In various embodiments, the symbols, images and indicia described above may be displayed mechanically, such as by one or more mechanical or physical reels. In other words, display 14 may include any electromechanical device, such as one or more rotatable or spinning wheels, reels or dice, any of which may be configured to display at least one or a plurality of games or other suitable images, symbols or indicia.

Figure 2:
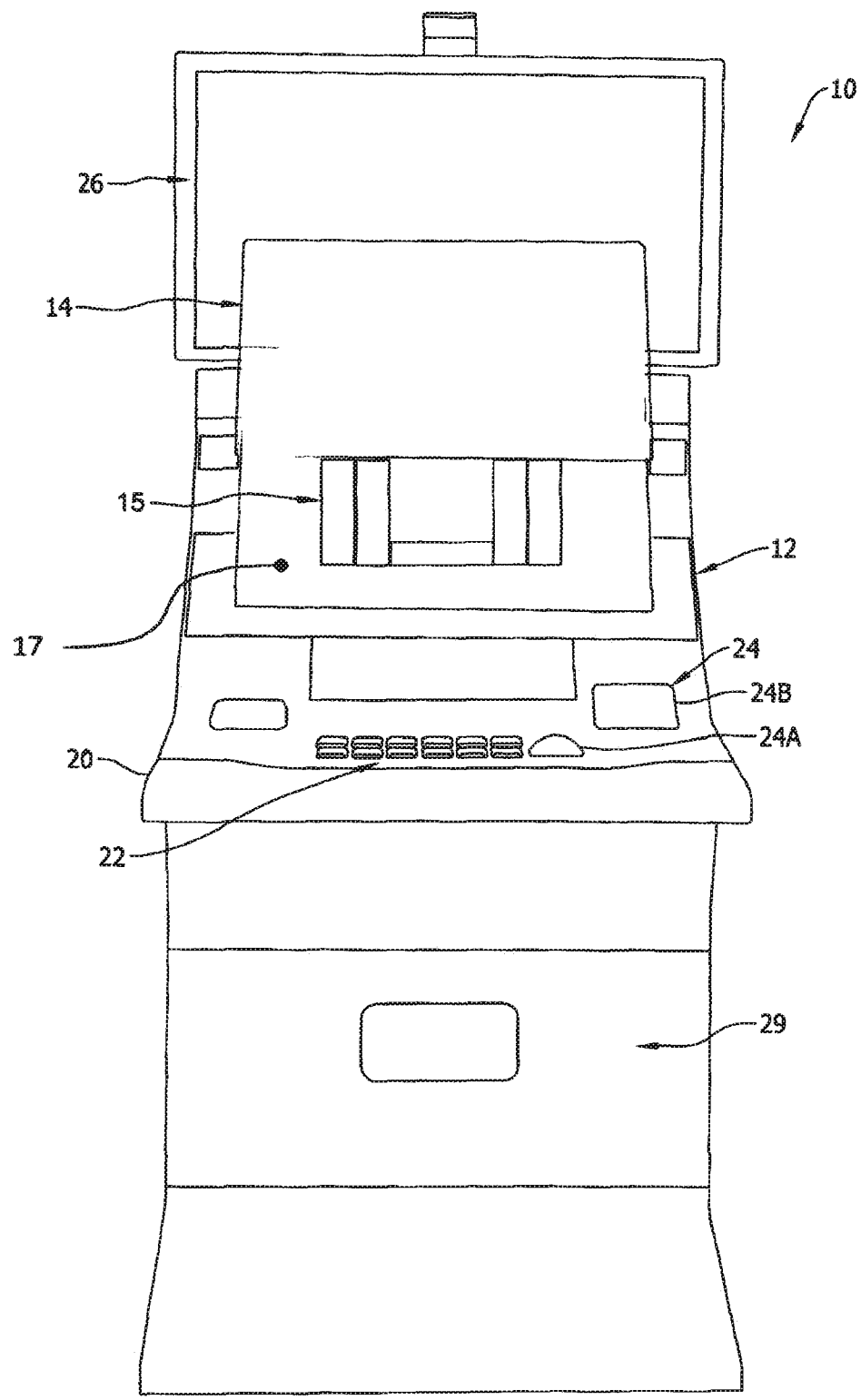
FIG. 2 illustrates a front view of the exemplary gaming machine of FIG. 1 with an access door in a raised configuration.

FIG. 2 is a front view of gaming machine 10 of FIG. 1, but illustrates display 14 in a raised configuration in accordance with an exemplary embodiment. Display 14 is coupled to console 12 through links 15, which will described further below. With display 14 in a raised configuration, an authorized individual may reach into an interior of the cabinet 12 through a doorway 17 where display 14 was previously located. Display 14 floats having zero effective weight and remains in the raised position until the authorized individual lowers display 14. Display 14 may be coupled to links 15 through a door panel (not shown). Display 14 may be secured in place in the closed configured through the use of a lock.

Figure 3:
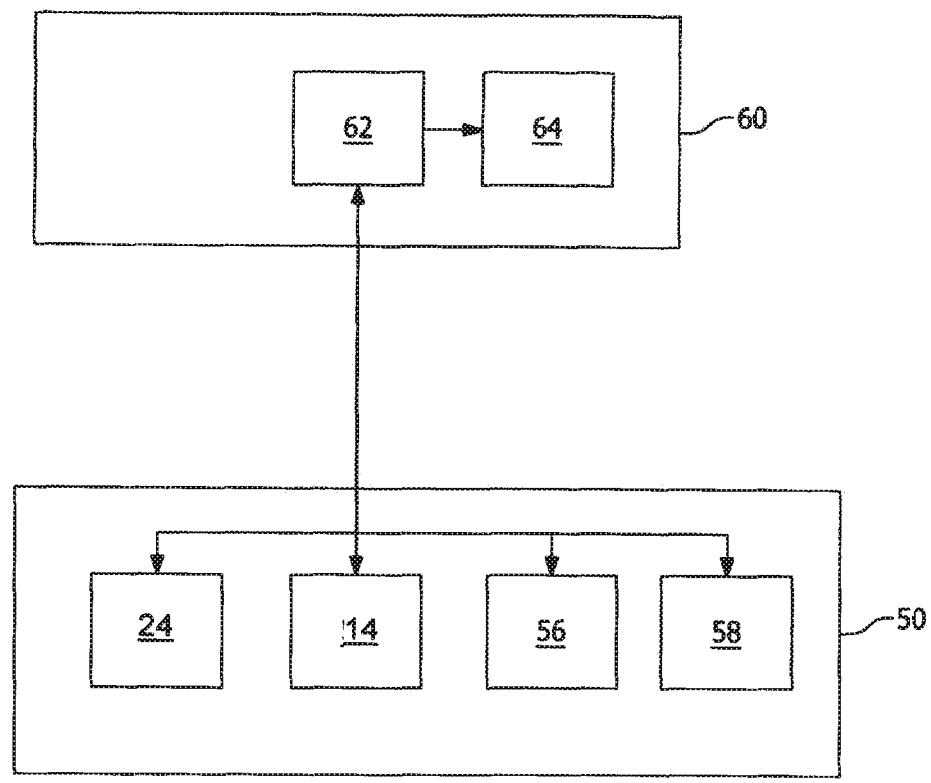
FIG. 3 is a block diagram of exemplary components of a gaming system.

FIG. 3 is a block diagram of an exemplary player interface 50 and game controller 60 of gaming machine 10. Player interface 50 and game controller 60 may be housed within gaming machine 10, such as on a printed circuit board located within cabinet 12 of gaming machine 10. As described herein, player interface 50 may be arranged to enable manual interaction between a player and the gaming system and for this purpose includes various input/output components required for the player to enter instructions to play the game and observe the game outcomes.

Components of player interface 50 may include at least one credit input mechanism 24, at least one display 14, a game play mechanism 56 (including one or more input devices that enable a player to input game play instructions or place a wager), and/or one or more audio output devices 58 (e.g., one or more speakers).

Game controller 60 may be in data communication with player interface 50 and may include at least one processor 62 or other suitable controller, such as a microprocessor, a microcontroller-based platform, a suitable integrated circuit or one or more application-specific integrated circuits (ASICs). Processor 62 may be coupled in communication with, or may be operable to access or to exchange signals with, at least one data storage module or memory 64. Processor 62 may thus be configured to retrieve game play instructions from memory 64, process the game play instructions in accordance with game play rules, and output one or more game play outcomes to display 14.

Memory 64 may include any suitable tangible, non-transitory, computer-readable storage medium. Memory 64 may store program code and instructions, executable by processor 62, to control gaming machine 10. Memory 64 may also store other data, such as, for example, image data, one or more pay tables or pay table data, event data, player input data, random or pseudo-random number generators, or numbers generated by a random number of pseudo-random number generator, look-up table data, and/or information and applicable game rules that relate to the play of gaming machine 10.

Figure 4:
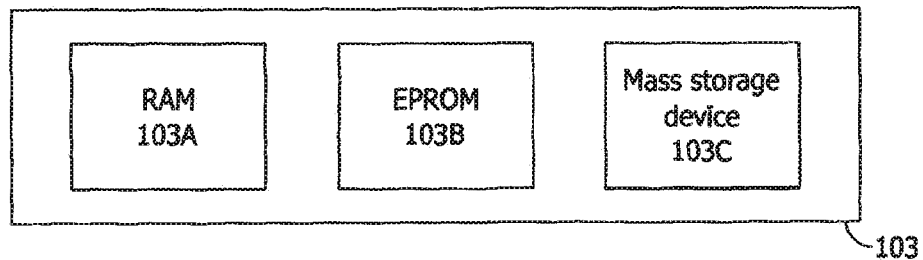
FIG. 4 is a schematic diagram of exemplary components of a memory for a gaming system.

With brief attention to FIG. 4, a block diagram of memory 64 is shown. Memory 64 may, in various embodiments, include a memory 103 (as described herein with reference to FIG. 3). Memory 103 may include random access memory (RAM) 103A, such as non-volatile RAM (NVRAM), magnetic RAM (MRAM), ferroelectric RAM (FeRAM) and other forms as commonly understood in the gaming industry. Memory 103 may further include read only memory (ROM), such as EPROM 103B or electrically erasable programmable read only memory (EEPROM). Memory 64 may further include one or more mass storage devices 103C, such as one or more hard drives, one or more solid state or flash memory components, one or more CD and/or DVD drives, and the like. Any other suitable magnetic, optical, and/or semiconductor memory may be used to operate in conjunction with gaming machine 10 that enables gaming machine 10 to function as described herein.

In an exemplary embodiment, RAM 103A may temporarily store one or more program files (and/or other related data) for execution by processor 62. EPROM 103B may include a boot ROM device and/or may contain some system or game related code. Mass storage device 103C may store one or more game programs, the integrity of which may be verified and/or authenticated by the processor 62 through the use of protected or encrypted code stored, for example, on EPROM 103B.

In various embodiments, part or all of the program code and/or operating data described above is stored in a detachable or removable memory, including, but not limited to, a suitable cartridge, disk, CD ROM, DVD or USB memory device. In addition, in various embodiments, all or part of the program code and/or operating data described above may be downloadable to memory 64 by way of any suitable computer network.

In an exemplary embodiment, a desktop computer, a laptop personal computer, a personal digital assistant (PDA), a smartphone, a tablet computing device or other portable computing device, and/or any other computerized platform may implement the computing operations of the present disclosure. For example, any suitable mobile computing device, such as any smartphone or tablet computing device, may implement and enable gameplay as described herein. It should be appreciated that each gaming machine 10 disclosed herein may include a device that has obtained approval from a regulatory gaming commission or a device that has not obtained approval from a regulatory gaming commission. It should also be appreciated that processor 62 and memory 64 may be collectively referred to herein as a "computer" or "controller."

Returning briefly to FIG. 1, in an exemplary embodiment, credit input mechanism 24 may be coupled in communication with processor 62. Credit input mechanism 24 may include any suitable credit input mechanism or device, such as a coin input chute 24A, a bill or ticket collector 24B, and the like. Credit input mechanism may be configured to receive any suitable monetary credit, such as money, coins, tokens, tickets, and the like. In various embodiments, credit input mechanism 24 may further include card reader devices, such as credit or debit card readers or validators for credit cards, debit cards, printed ticket printers and/or readers, and the like.

In various embodiments, a player may insert an identification card (not shown) into a card reader of gaming machine 10. The identification card may be a smart card that includes a programmed microchip or a magnetic strip coded with a player's identification, credit totals (or related data) and other relevant information. A player may further carry a portable device, such as a cell phone or smart phone, a radio frequency identification tag or any other suitable wireless communication device, which communicates a player's identification, credit totals (or related data) and other relevant information to gaming machine 10. In an embodiment, money may be transferred to gaming machine 10 via an electronic funds transfer process. When a player funds gaming machine 10, processor 62 may determine an amount of funds entered and display the corresponding amount on the display 14.

Game play mechanism 56 may include at least one input device that is coupled in communication with processor 62. An input device may include any device that enables a player to produce an input signal that is receivable by processor 62. For example, in one embodiment, after funding gaming machine 10, the input device may include a game activation device, such as a pull arm or one or more play button 22 that enables the player to start the game or a sequence of events in gaming machine 10. Play button 22 may include any suitable play activator such as a bet one button, a max bet button, or a repeat the bet button. In an embodiment, after appropriate funding of gaming machine 10, game play may begin automatically.

In an exemplary embodiment, one input device may include a "Bet One" button. A player may place a wager or bet by pushing the Bet One button and may increase the wager by repeatedly depressing or selecting the Bet One button. In various embodiments, an input device includes a "Bet Max" button that enables a player to place a maximum wager permitted during a particular game or game session.

In various embodiments, an input device may also include a "Cash Out" button. A player may depress or select a Cash Out button to receive a cash payment or other suitable form of payment corresponding to the number of credits remaining. In an embodiment, when the player cashes out, the player receives coins or tokens in a coin payout tray. A player may further receive tickets or credit slips, or the player's electronically recordable identification card may be funded, in response to selection of a Cash Out button.

In various embodiments, an input device may include a touch-screen that is coupled to a touch-screen controller, or some other touch-sensitive display overlay, to enable player interaction with images presented on display 14. A touch-screen and/or touch-screen controller may be communicatively coupled to a video controller, such that a player may provide input signals to gaming machine 10 by physically manipulating or interacting with the touch-screen.

Gaming machine 10 may include a sensor, such as a camera (not shown) coupled in communication with processor 62. The camera may, in various embodiments, be controlled by processor 62, such that a player may direct the orientation and focus of the camera to acquire an image of a player actively playing gaming machine 10 and/or a surrounding area of gaming machine 10. In an exemplary embodiment, the camera may selectively acquire still or moving (e.g., video) images and may be configured to acquire the images in either an analog, digital, or other suitable format. Display 14 may be configured to display the image acquired by the camera, as well as to display the visible manifestation of the game in split screen or picture-in-picture fashion. For example, the camera may acquire an image of the player and processor 62 may incorporate that image into the interactive and/or secondary game as a game image, symbol or indicia.

Figure 5:
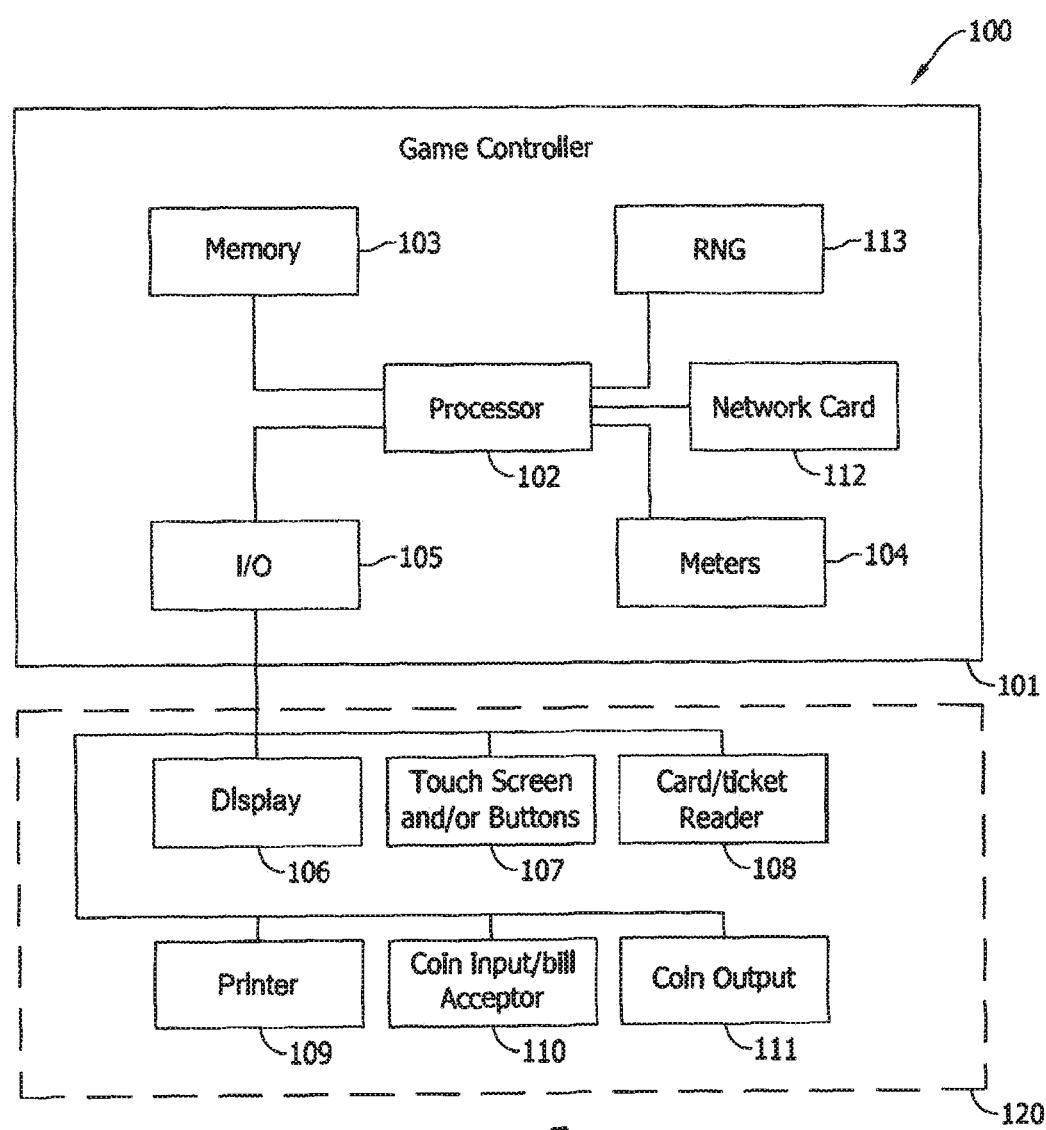
FIG. 5 is a schematic diagram of exemplary components of a gaming system.

FIG. 5 illustrates a more detailed block diagram of various exemplary functional components of a gaming machine 100, which may be the same as or different from gaming machine 10 (as shown in FIG. 3). The foregoing description of components (e.g., display 14, player interface 50, and game controller 60) may therefore apply to the description of similar components in gaming machine 100. For instance, processor 62 may be the same as or different from 102, as described below. Similarly, memory 64 may be the same as or different from memory 103 as described below.

Accordingly, gaming machine 100 may include a game controller 101 (which may include a processor 102 mounted on a circuit board, as described in greater detail above). Instructions and data to control operation of processor 102 may be stored in a memory 103 that is in data communication with processor 102. Gaming machine 100 may include both volatile and non-volatile memory and more than one of each type of memory, with such memories being collectively represented by memory 103.

Gaming machine 100 may further include one or more gaming meters, such as, for example, one or more meters implemented in software, one or more hardware meters 104, and/or any suitable combination of software and/or hardware meters (to ensure regulatory compliance and to monitor player credit). Gaming machine 100 may also include an input/output (I/O) interface 105 for communicating with peripheral devices of gaming machine 100. Input/output interface 105 and/or the peripheral devices may include intelligent devices with their own memory for storing associated instructions and data. A random number generator module 113 may generate random numbers for use by processor 102. Persons skilled in the art will appreciate that random number generator module 113 includes a pseudo-random number generator.

In an exemplary embodiment, a player interface 120 includes peripheral devices that communicate with game controller 101 including one or more displays 106, a touch screen and/or input buttons 107 (which provide a game play mechanism), and a credit input mechanism, such as a card and/or ticket reader 108, a printer 109, a bill acceptor and/or coin input mechanism 110, and a coin output mechanism 111. The credit input mechanism is configured to receive a credit wager to initiate play of a base game, and establish a credit balance (e.g., using the received credit wager) that is increasable and decreasable based on wagering activity within a game. Player interface 120 also includes a payout mechanism such as a printer 109 and/or a coin output mechanism 111. The payout mechanism is configured to output a payout to a player of gaming machine 100 based on an outcome of the game (e.g., a base game and/or a feature game).

Additional hardware may be included as part of gaming machine 100, or hardware may be omitted as required for the specific implementation. For example, although buttons or touch screens are typically used in gaming machines to allow a player to place a wager and to initiate a play of a game any input device that enables the player to input game play instructions may be used. For example, in some gaming machines a mechanical handle may be used to initiate a play of the game. Persons skilled in the art will also appreciate that a touch screen can be used to emulate other input devices, such as, for example, a touch screen that can display virtual buttons that a player can "press" by touching the screen where they are displayed.

In addition, gaming machine 100 may include a communications interface, such as, for example a network card 112. Network card 112 may, for example, send status information, accounting information and/or other information to a bonus controller, central controller, server or database and receive data or commands from the bonus controller, central controller, an/or server or database. In various embodiments (e.g., embodiments that employ a player marketing module), communications over a network may be via the player marketing module—e.g., the player marketing module may be in data communication with one or more of the above devices.

In various embodiments, components of gaming machine 100 may be distributed. For example, in an embodiment, input/output devices 106, 107, 108, 109, 110, and 111 may be provided remotely from game controller 101.

Figure 6:
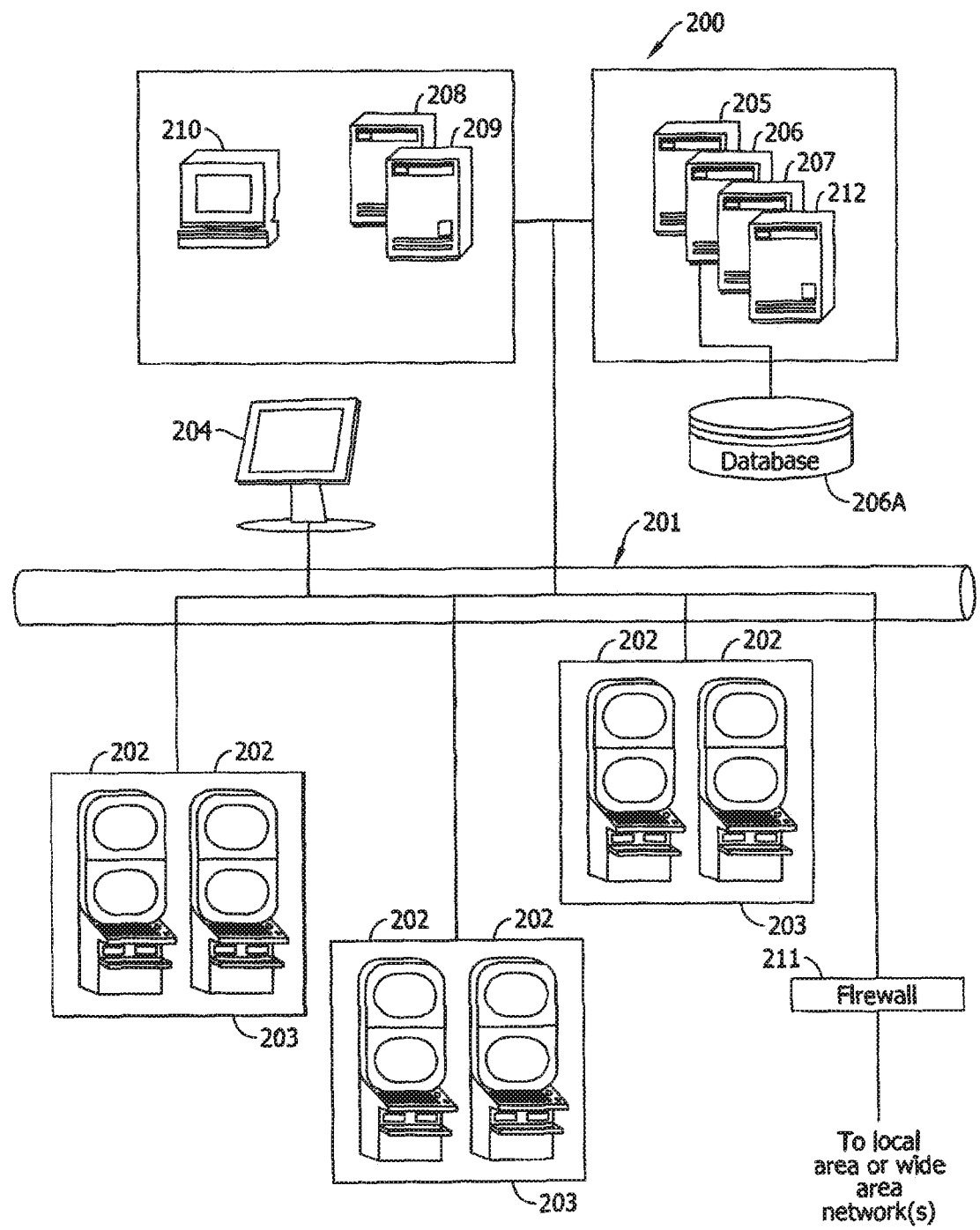
FIG. 6 is a schematic diagram of an exemplary network gaming system.

FIG. 6 illustrates such an exemplary distributed gaming system 200. Gaming system 200 may include a network 201, which, for example, may include a wired or wireless network, such as a Wi-Fi or BLUETOOTH network, an Ethernet network, an RS-232 network, and/or any combination thereof. In an exemplary embodiment, gaming machines 202, shown arranged in three banks 203 of two gaming machines 202, are connected to network 201. Gaming machines 202 may provide a player operable interface and may be the same as (or substantially similar to) the gaming machines 10 and 100 (as shown in FIGS. 3 and 4), or may have simplified functionality depending, for example, on various game play requirements.

One or more displays 204 may also be connected to network 201. For example, displays 204 may be associated with one or more banks 203 of gaming machines. Displays 204 may be used to display representations associated with game play on gaming machines 202 and/or used to display other representations, such as, for example promotional or informational material. Displays 204 may be the same as or substantially similar to display 14, as described above.

In a thick client embodiment, game server 205 may implement part of the game played by a player using gaming machine 202, and gaming machine 202 may implement part of the game. In such an embodiment, insofar as both game server 205 and gaming machine 202 may implement part of the game, they may collectively include a game controller. A database management server 206 may manage storage of game programs and associated data for downloading or access by gaming machines 202 in a database 206A. Typically, if gaming system 200 enables players to participate in a jackpot game, a jackpot server 207 may be provided to perform accounting functions for the jackpot game. A loyalty program server 212 may also be provided.

In a thin client embodiment, game server 205 may implement most or all of the game played by a player using gaming machine 202, and gaming machine 202 may, in essence, function provide little more than the player interface. In such an embodiment, game server 205 may include the game controller. Gaming machine 202 may thus receive player instructions and transmit those instructions to game server 205. Further, in a thin client embodiment, gaming machines 202 may be computer terminals, such as, for example, personal computers, laptop computers, tablet computing devices, smartphones, and the like running software that provides a player interface. Other client/server configurations are contemplated and are within the scope of this disclosure. Additional details of a client/server architecture may be found in WO 2006/052213 and PCT/SE2006/000559, the disclosures of which are incorporated herein by reference in their entireties.

One or more servers may be provided to assist in the administration of gaming system 200. Such servers may include, for example, a gaming floor management server 208, and a licensing server 209 to monitor the use of licenses relating to particular games. An administrator terminal 210 may be provided to allow an administrator to run network 201 and the devices connected to network 201.

Gaming system 200 may communicate with other gaming systems and/or other local networks, such as, for example a corporate network, and/or a wide area network such as the Internet Communications may be filtered through a firewall 211.

Persons skilled in the art will appreciate that in accordance with known techniques, functionality at the server side of network 201 may be distributed over a plurality of different computers. For example, elements may be run as a single "engine" on one server or a separate server may be provided. For example, game server 205 may implement a random number generator engine. Alternatively, a separate random number generator server may be provided. Further, persons skilled in the art will appreciate that a plurality of game servers may be provided to implement different games or a single game server may implement a plurality of different games as required by the terminals.

In an exemplary embodiment, a player may place a wager using the game play mechanism 56. A game (or game session) may be initiated in response to placement of the wager, a plurality of symbols randomly drawn, and a game (or game session) outcome determined based upon the symbols drawn. A game outcome may be compared to a pay table (which may be stored in a computer memory) to determine a payout or award (also referred to herein as a win entitlement). Persons skilled in the art will appreciate that a player's wager can be varied from game to game dependent on player selections.

In various embodiments, a wager may include a selection of a number of lines to be played during a game session. Such lines may include an interconnected combination of symbol display positions. Each selected line may be evaluated to identify winning combinations of symbols. A pay table (e.g., a pay table stored in memory 64) may be referenced to identify a payout or award based upon an identified winning combination of symbols. In various embodiments, an award may be multiplied or increased by a multiplication factor as well.

In an exemplary embodiment, gaming machine 202 may generate an award that is not based solely upon a number of a lines selected. For example, "scatter" pays (e.g., randomly selected awards that are not identified based upon a plurality of adjacent symbols) may be awarded independently of a player's selection of pay lines.

In many gaming machines, monitors are placed on the access door and are designed to be a main point of entry into the gaming cabinet for service and repair. Having the monitor mounted on the access door enables access to the monitor and the door to be concealed around the monitor.

Figure 7:
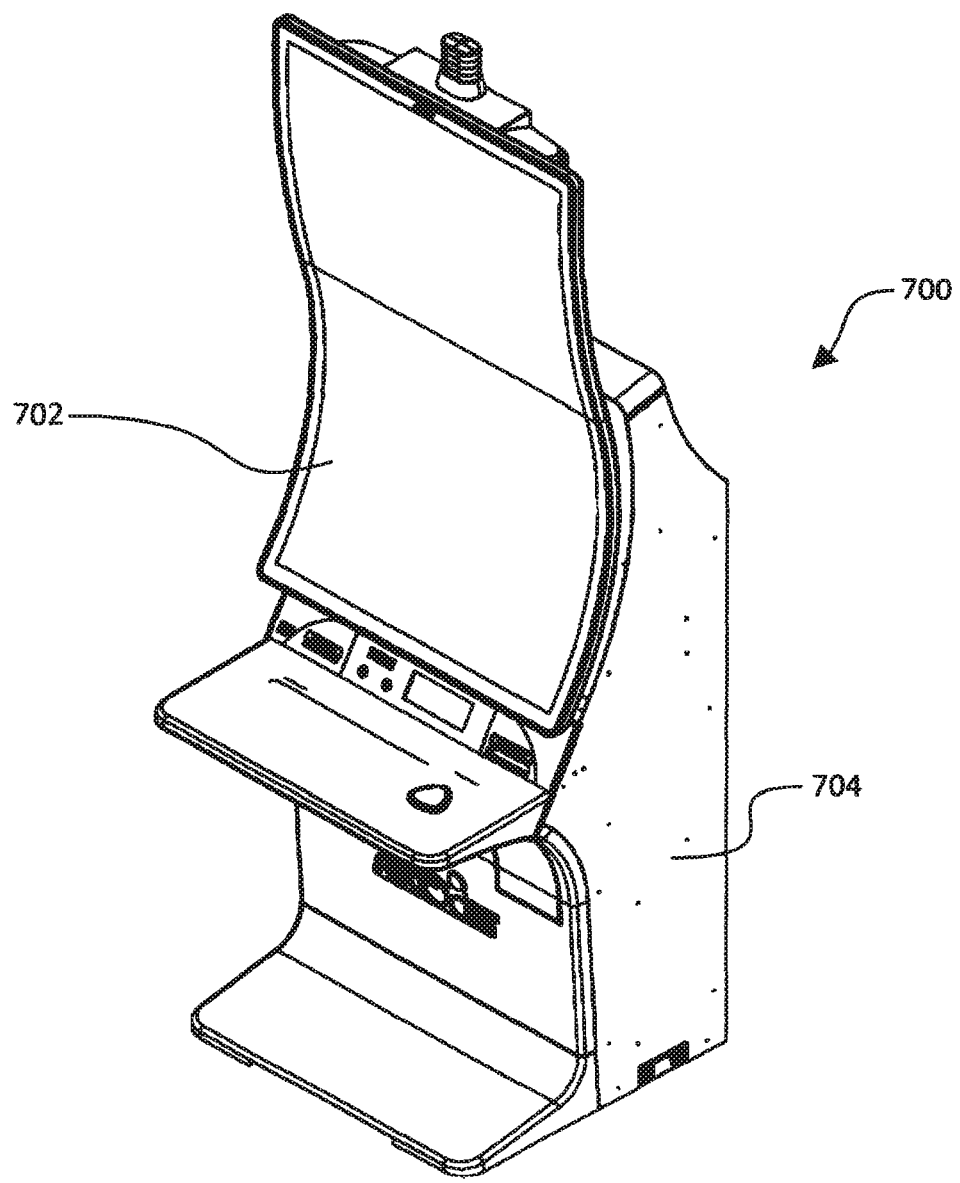
FIG. 7 illustrates an isometric view of an exemplary gaming machine.

FIG. 7 illustrates an exemplary gaming machine 700 having a zero effective weight articulating door. Gaming machine 700 has a cabinet 704 with a monitor 702 acting as an access door. Monitor 702 is secured to cabinet 704 by way of an articulating door mount as will be described below. Although aspects of the exemplary embodiment will be described in reference to a monitor, it should be understood that the embodiments are applicable to weighted doors and combinations of doors and monitors. When installed, monitor 702 moves between a first position covering doorway 708 inhibiting access to interior 706 of cabinet 704 and a second position in which doorway 708 is exposed, allowing access to interior 706.

Figure 8:
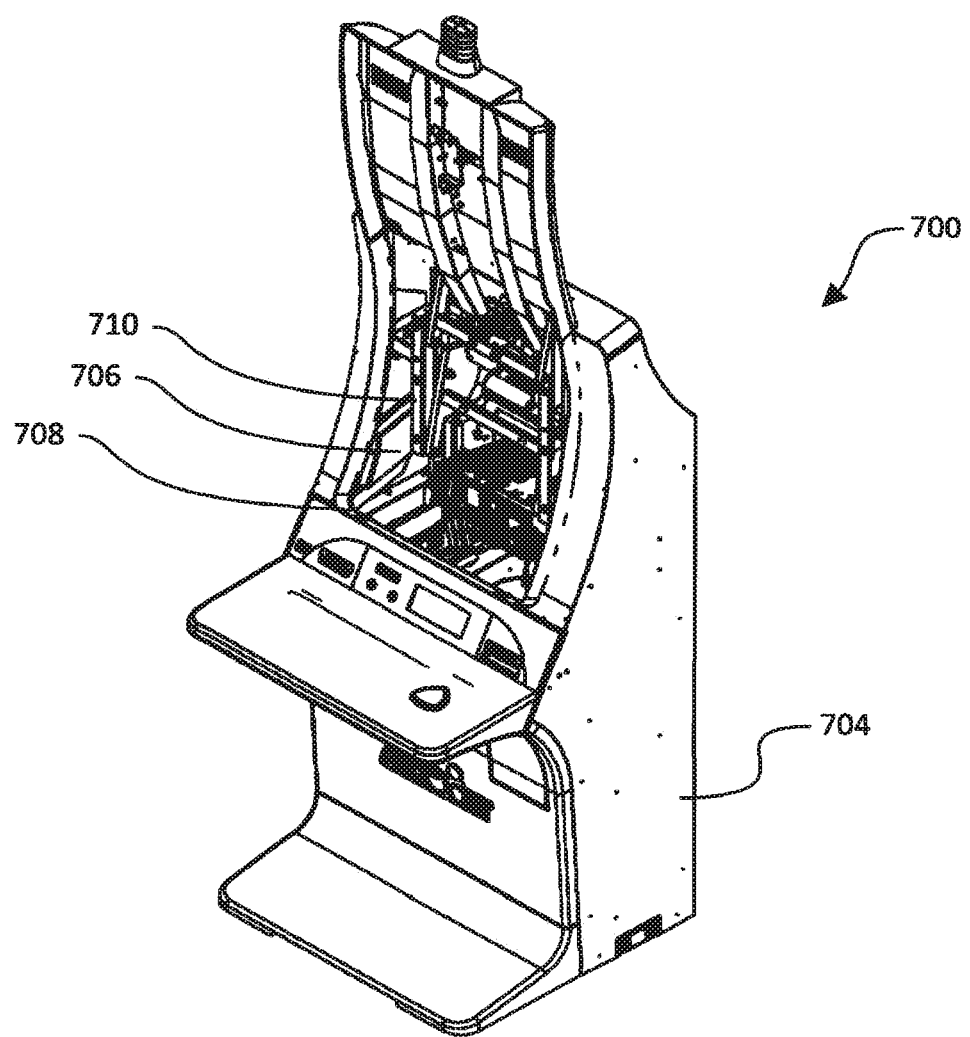
FIG. 8 illustrates an isometric view of the exemplary gaming machine of FIG. 7 with the monitor removed.
Figure 9:
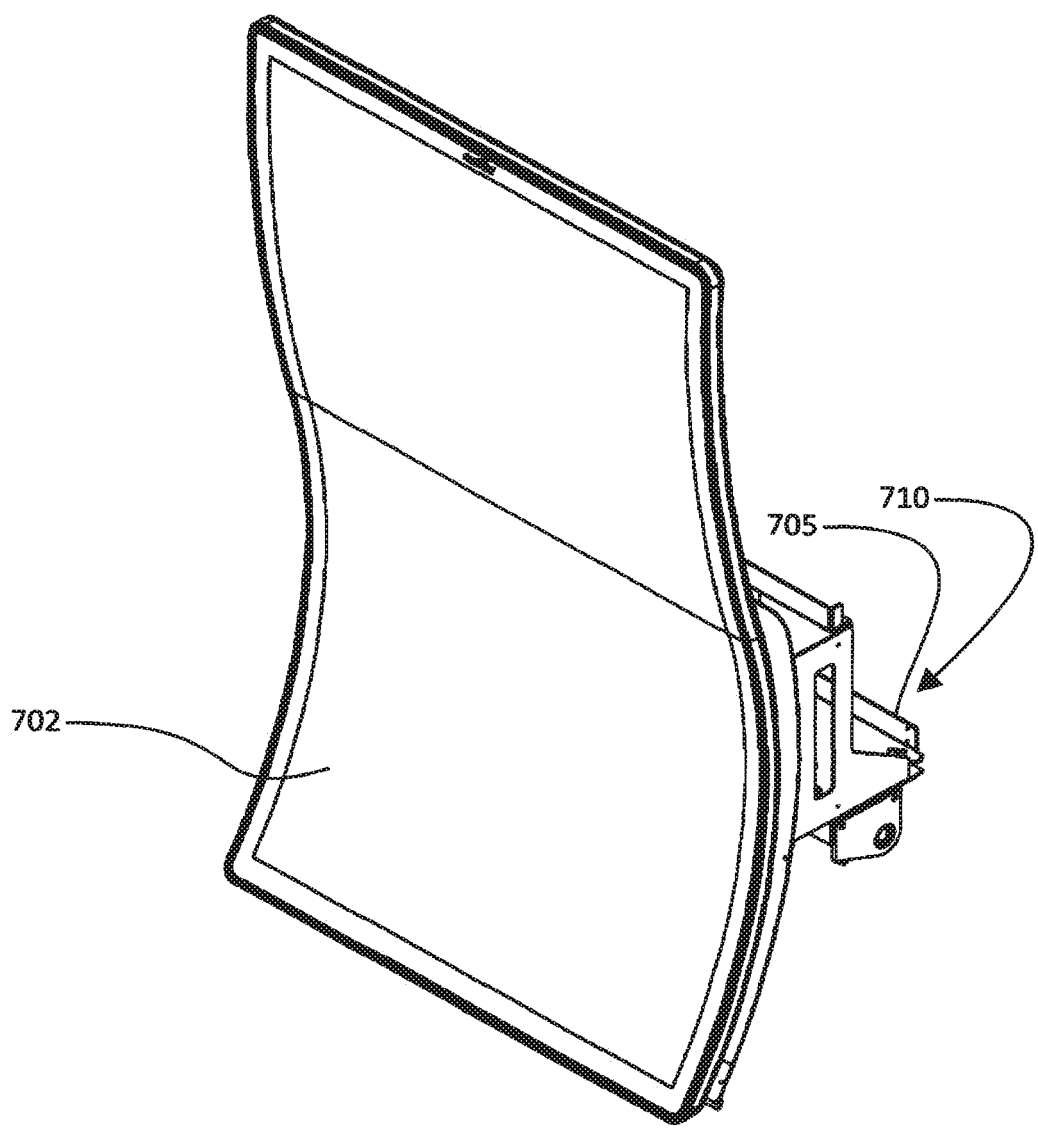
FIG. 9 illustrates an isometric view of a monitor door of the exemplary gaming machine of FIG. 7.
Figure 10:
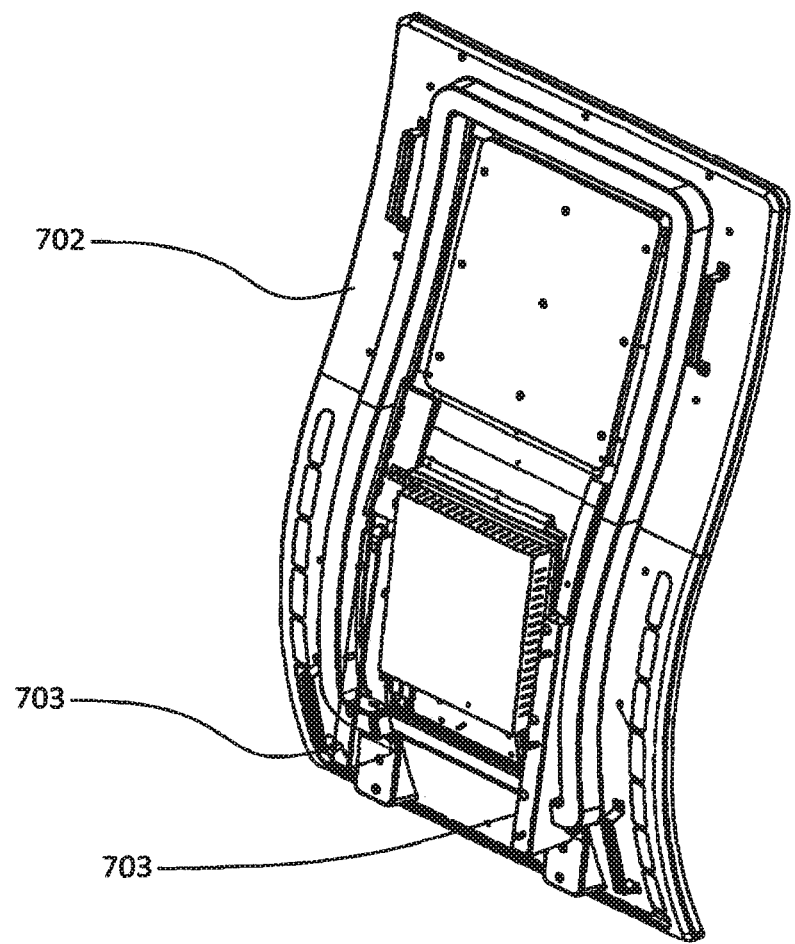
FIG. 10 illustrates an isometric view of a rear portion of the monitor door of FIG. 9.

FIG. 8 illustrates exemplary gaming machine 700 of FIG. 7, but with monitor 702 removed to show interior 706 of cabinet 704. Monitor 702 couples to articulating door mount 710 through conventional means such as bolts and screws. FIG. 9 illustrates monitor 702 and articulating door mount 710 removed from cabinet 704 for clarity. Articulating door mount 710 is configured to be secured to cabinet 704 through conventional means, such as a bolt or screw through mounting holes in bracket 705. FIG. 10 illustrates the back side of monitor 702 with articulating door mount 710 removed. Monitor 702 has a mounting surface 703 configured to be secured to articulating door mount 710.

Figure 11:
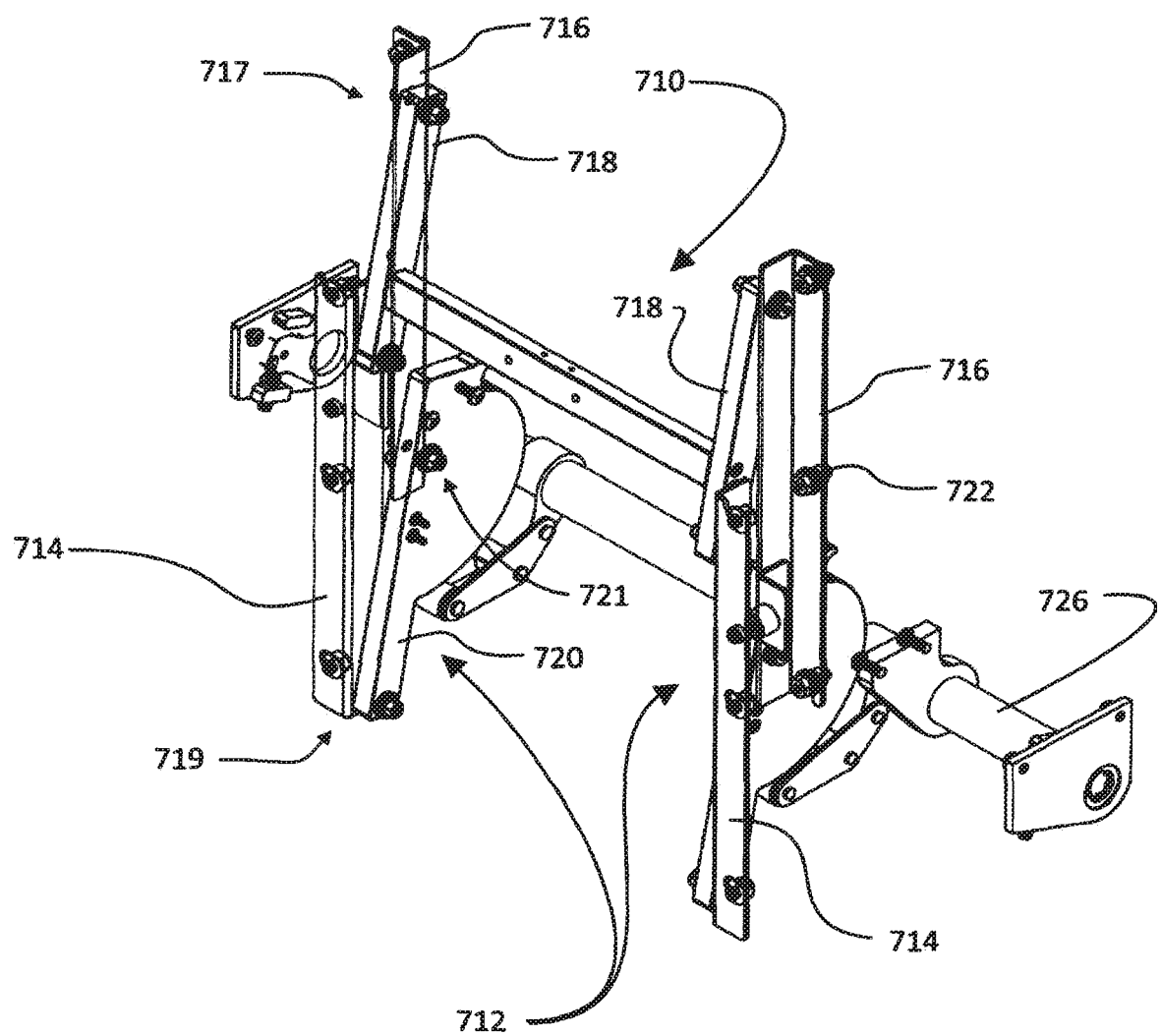
FIG. 11 illustrates an isometric view of an exemplary door mount in a closed position.
Figure 12:
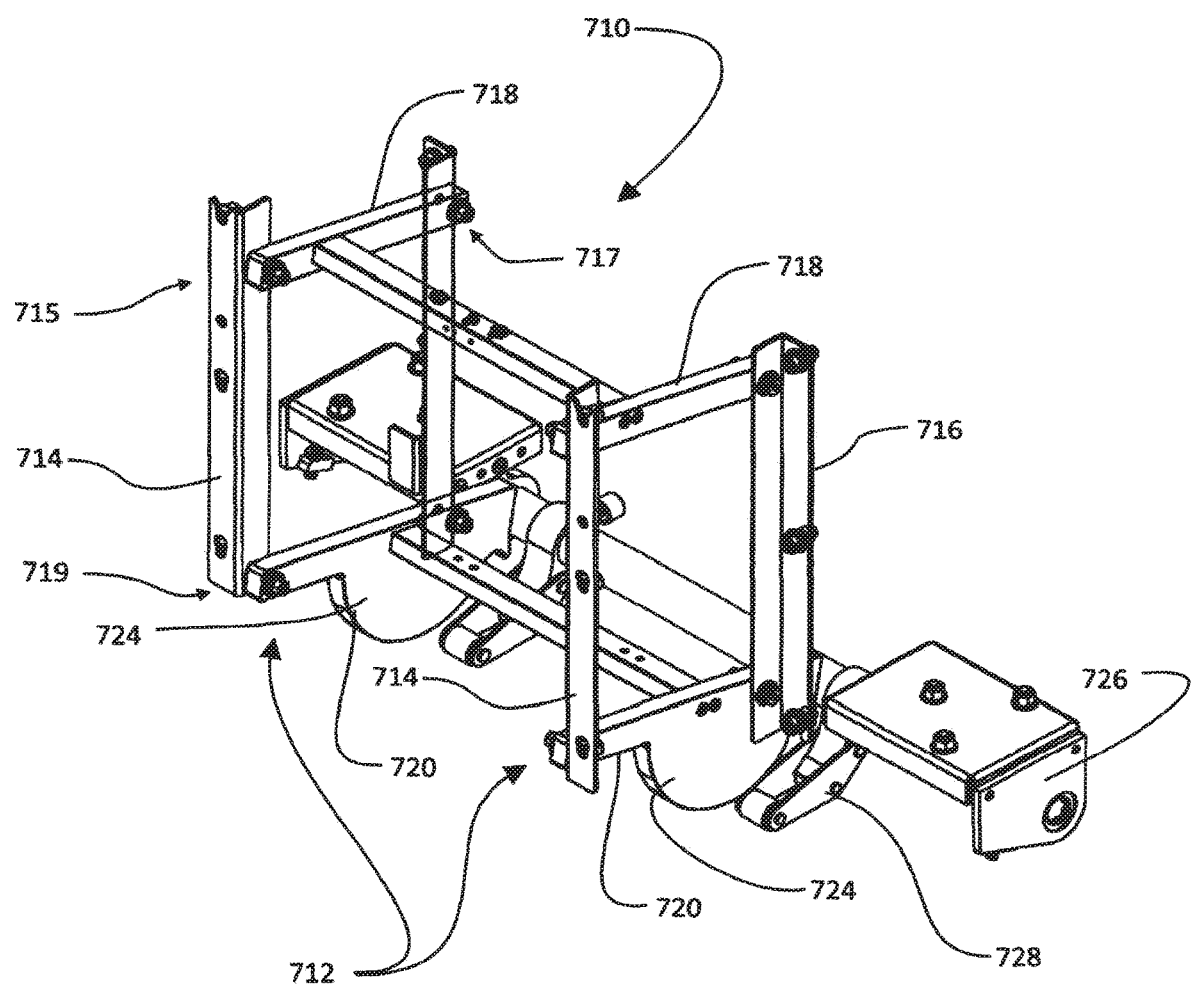
FIG. 12 illustrates the exemplary door mount of FIG. 11 with the door mount partially raised.
Figure 13:
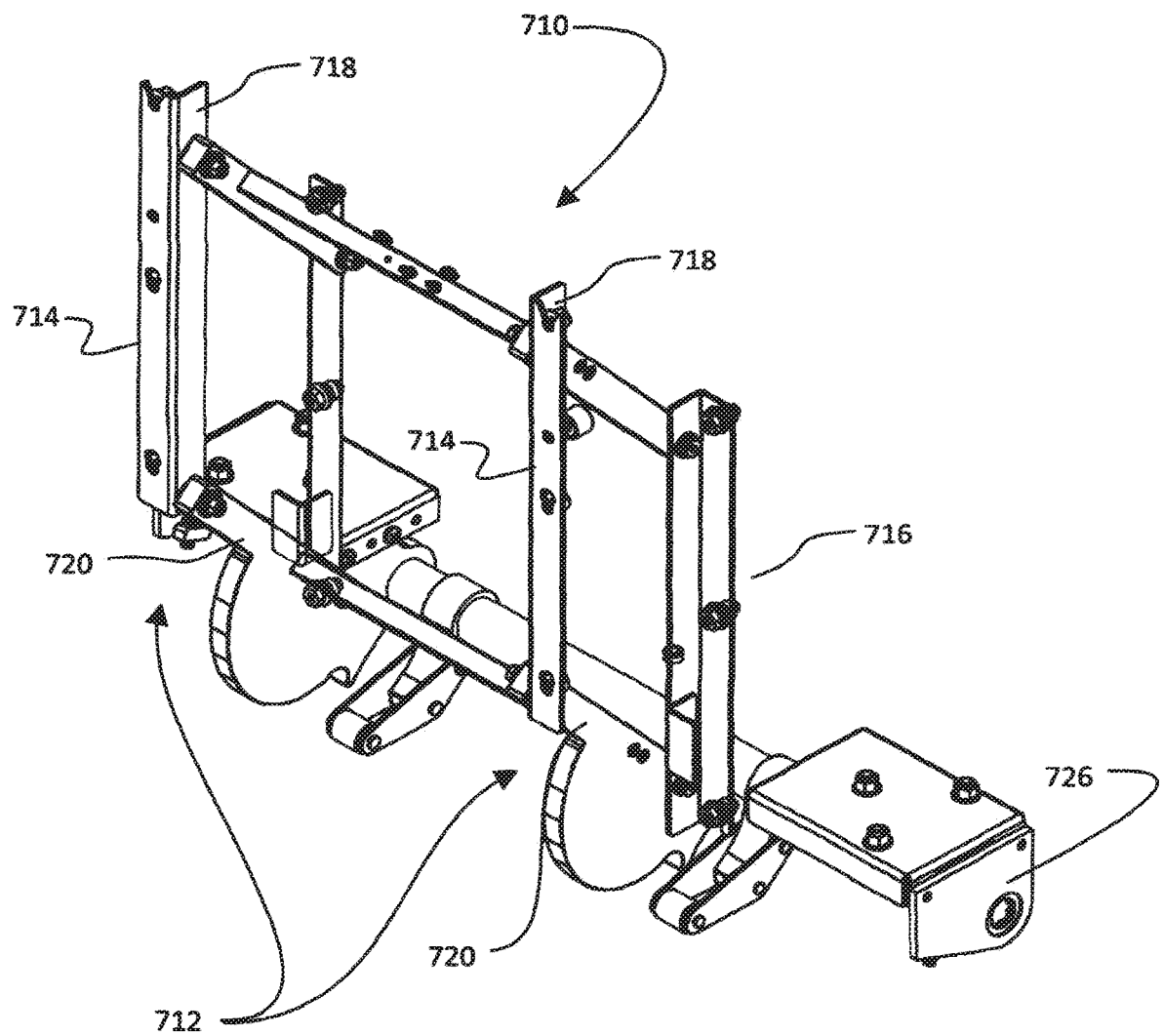
FIG. 13 illustrates the exemplary door mount of FIG. 11 with the door mount in a raised position.

FIG. 11 through FIG. 13 illustrate exemplary articulating door mount 710, but with monitor 702 removed for clarity. FIG. 11 illustrates articulating door mount 710 in a lowered or closed position, FIG. 12 illustrates articulating door mount 710 in a partially open position, and FIG. 13 illustrates articulating door mount 710 in a raised or open position. Articulating door mount 710 secures monitor 702 to cabinet 704 and supports monitor 702 when accessing interior 706 of cabinet 704. At least one linkage assembly 712 is used to guide monitor 702 up and down in a determined path. Multiple linkage assemblies 712 may be used to improve rotational stability of monitor 702. Additionally, linkage assemblies 712 may share components. For example, a link may be elongated horizontally and span multiple linkage assemblies. Exemplary articulating door mount 710 has two linkage assemblies 712, although more or less linkage assemblies are possible.

Linkage assembly 712 has a stationary link 716, a door link 714, an upper link 718, and a lower link 720. A biasing mechanism 726 biases door link 714 upward through a cam 724. Biasing mechanism 726 is coupled to a link and cam 724 is coupled to an adjacent link. In the exemplary embodiment, biasing mechanism 726 is coupled to stationary link 716 and cam 724 is integrated in lower link 720. In other embodiments, the biasing mechanism may be coupled to any one of the links and the cam to an adjacent link. For example, if a biasing mechanism were coupled to lower link 720, cam would be coupled to either stationary link 716 or door link 714.

Each link is secured to an adjacent link through a rotatable coupling. A rotatable coupling is defined as a connection that secures two points of adjacent components together preventing translation but allowing rotation. A hinge is an example of a rotatable coupling that allows rotation in a single direction. A ball and socket is an example of a rotatable coupling that allows rotation in a three directions. In the exemplary embodiments, the links are secured together by the shaft of a bolt passing through eyeholes in the links allowing the links to rotate about the axis of the shaft.

Stationary link 716 is configured to be secured to cabinet 704. Stationary link 716 may be secured to cabinet 704 through bolts 722 or other conventional fasteners. Stationary link 716 may be removed from cabinet 704 for ease in assembly and maintenance by removing bolts 722. Door link 714 is configured to be coupled to monitor 702 and moves at each end relative to cabinet 704. Door link 714 may be a separate link secured to monitor 702 or a door, or door link 714 may be the door or monitor itself. For example, door link 714 could be a rigid door having an upper tab with an eyehole and a lower tab with an eyehole for connection to a link. Upper link 718 is rotatably coupled to door link 714 through a first rotatable coupling 715 and to stationary link 716 through a second rotatable coupling 717. Similarly, lower link 720 is rotatably coupled to door link 714 through a third rotatable coupling 719 and to stationary link 716 through a fourth rotatable coupling 721.

Opposing links may be of equal length. For example, upper link 718 and lower link 720 may be the same length, and door link 714 and stationary link 716 may be the same length. In such embodiments, door link 714 and stationary link 716 remain parallel throughout their movement. Thus, monitor 702 mounted to door link 714 would remain at the same angle as monitor 702 is lifted.

Biasing mechanism 726 is configured to bias door link 714 upward. Biasing mechanism 724 may bias door link upward directly, or more commonly through another link. For example, a torque bias on either upper link 718 or lower link 720 will bias door link 714. Biasing mechanism 726 may be a spring and in the exemplary embodiment is a torsion spring.

Biasing mechanism 726 interacts with cam 724 to provide a relatively constant bias to door link 714, such that the weight of monitor 702 is supported at each position of door link 714. Having a relatively constant bias results in a monitor that has the sensation of being weightless. In the exemplary embodiment, a torsion spring biases arm 728 to rotate about torsion spring. Arm 728 contacts cam 726 and biases cam 724. Because cam 724 is coupled to lower link 720, contact with the arm 728 provides a torque bias to lower link 720 which then biases door link 714 upward.

The torsion spring is advantageous in that it may have a relatively constant force when compressed. A conventional spring, such as a linear spring requires a linearly increasing force to compress it. As a result, a door biased by a linear spring may have a bias force much greater than the weight of the door and monitor when it is compressed, causing them to lift or spring when the door is opened. A torsion spring, in comparison, may have a relatively constant torque throughout its range of motion putting a uniform pressure on the linkage. The force needed to lift the door is therefore relatively constant. By reducing the effective weight of the monitor door, an operator may open and close the door without having to overcome an additional force need to keep the door open.

In some embodiments, biasing mechanism 726 is made from several small rods in torsion. The spring rate of the biasing mechanism 726 is determined by the number and size of the small rods. If there is a failure in a rod of the biasing mechanism 726, the spring rate is only reduced by a small percent preventing monitor 702 from fully closing. This protects the operator from being injured from a falling monitor 702 in any position. One benefit of using a biasing mechanism 726 to give zero weight to monitor 702 is that all required variables are constant, so the operation life of the cabinet door can be calculated without addition inputs like shelf life, opposing force and environmental factors. By determining the operation life, the cabinet door can have a determined replacement schedule past the operation life of the cabinet making the door operation service free.

Linkage assembly 712 prevents monitor 702 from swinging out excessively while maintaining monitor 702 in an upright position during movement. As can be seen in a comparison of FIG. 10 and FIG. 12, when monitor 702 is raised to its maximum vertical extent, its horizontal displacement is minimal compared to a conventional swinging door.

Cam 724 may be a separate component mounted to a link, or in some embodiments cam 724 may be integrally formed with a link. For instance, in the exemplary embodiment, cam 724 and lower link 720 are a single piece. Cam 724 provides a smooth transition surface biasing mechanism 726 apply its bias. Biasing mechanism 726 pushes cam 724 with enough force to counteract the weight of monitor 702 and linkage assembly 712 allowing monitor 702 to become effectively weightless. Because monitor 702 is essentially weightless, monitor 702 remains in any position at which it is left. For example, if a user moves it halfway up, it remains halfway up absent any further force.

Figure 14:
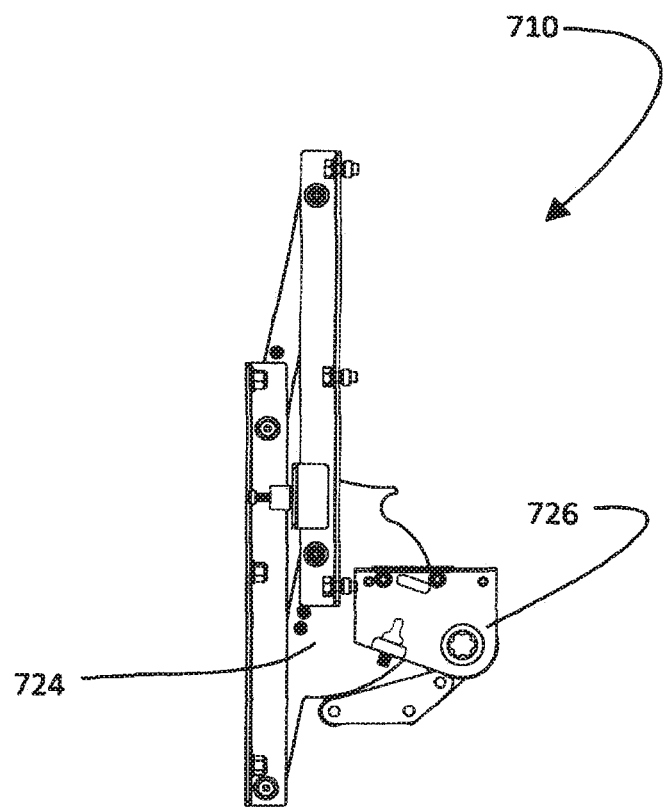
FIG. 14 illustrates a side view of the exemplary door mount of FIG. 11.
Figure 15:
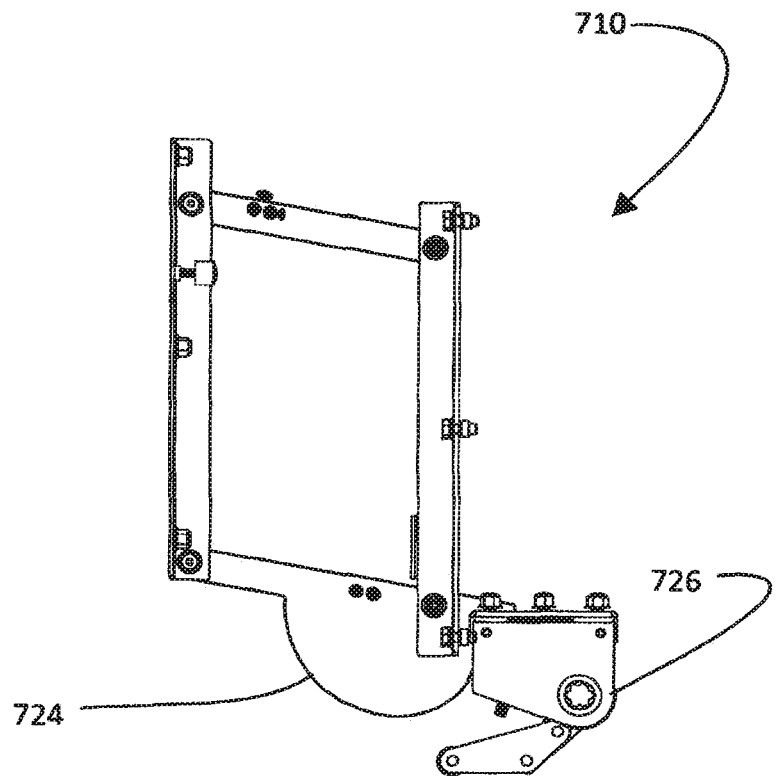
FIG. 15 illustrates a side view of the exemplary door mount of FIG. 11 with the door mount partially raised.
Figure 16:
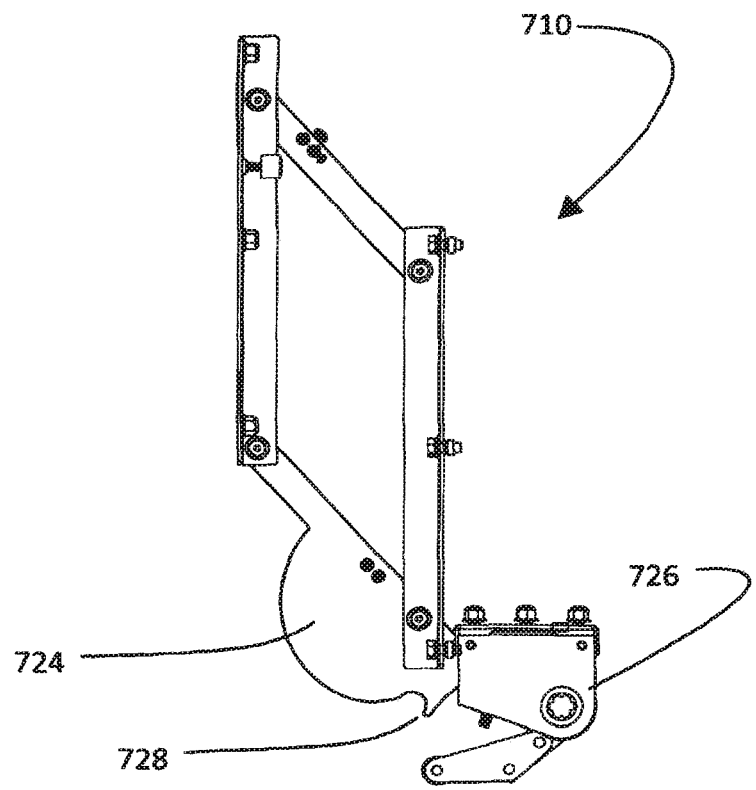
FIG. 16 illustrates a side view of the exemplary door mount of FIG. 11 with the door mount raised.

FIG. 14 through FIG. 16 are side views of articulating door mount 710 and illustrate the operation of biasing mechanism 726 and cam 724. FIG. 14 illustrates articulating door mount 710 in a closed position, FIG. 15 illustrates articulating door mount 710 in a mid-position, and FIG. 16 illustrates articulating door mount 710 in an open position. In each of these positions, cam 724 and biasing mechanism 726 cooperate to provide a relatively constant upward force balancing the weight of monitor 702. The force exerted by biasing mechanism 726 is related to the effective radius of cam 724. When cam 724 has a low effective radius, there is little relative preload on biasing mechanism 726 and the bias is minimal. When cam 724 has a higher effective radius, the preload of biasing mechanism 726 increases and the bias force is increased.

In FIG. 14, the weight of monitor 702 is nearly tangential to the lower link 720, and a minimal amount of torque is required to counteract the weight of the monitor 702. In this position, cam 724 has a minimum effective radius and provides little pre-load to biasing mechanism 726. In FIG. 15, the weight of monitor 702 is perpendicular to lower link 720 and the greatest amount of torque is required to balance the weight of monitor 702. In this position, cam 724 has a greater effective radius pre-loading biasing mechanism 726. This in turn results in a greater force being applied to the lower link 720, balancing the weight of monitor 702. In FIG. 16, monitor 702 is at its maximum height. The weight of monitor 702 is again nearly tangential to the lower link 720 and less preload is required from biasing mechanism 726 to support monitor 702. Thus cam 724 has a lower effective radius in this position. Additionally, cam 724 includes a stop 728 preventing monitor 702 from being over opened.

Monitors of varying weight may be supported using the described system. Different weights will require biasing mechanisms having different spring constants. For example, a lighter monitor may be supported by removing some of the rods from the torsion spring, while a heavier monitor may be supported by adding rods to the torsion spring. Because the range of motion would not change, the cam may be reused in such embodiments. If a different biasing mechanism were used, or if the geometry of the linkage assemblies were changed, it may be necessary to use a different cam shape. In general, in areas requiring a greater bias, the cam has a greater radius to preload the biasing mechanism, while in areas requiring lower bias; the cam has a reduced radius.

Exemplary embodiments of a gaming machine, a monitor door, and a door mount for electronic gaming are described above in detail. The disclosure is not limited to the specific embodiments described herein, but rather, components of the systems and/or articles and/or steps of the methods may be utilized independently and separately from other components and/or steps described herein. For example, the configuration of components described herein may also be used in combination with other processes, and is not limited to practice with the systems, articles, and related methods as described herein. Rather, the exemplary embodiment can be implemented and utilized in connection with many applications in which a game or bonus game is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An articulating mount for an access door, comprising:
  a four-link mechanism having a stationary link configured to be fixedly coupled to a gaming console, a door link positioned opposite the stationary link and configured to be fixedly coupled to a door, an upper link rotatably coupled to the stationary link and the door link, and a lower link rotatably coupled to the stationary link and the door link;
  a cam coupled to at least one link of the four link mechanism, the cam comprising an arcuate cam surface;
  a biasing mechanism coupled to a link adjacent the at least one link; and
  an arm coupled to the biasing mechanism and extending radially outward therefrom, the arm configured for rotation with the biasing mechanism and positioned to engage the arcuate cam surface to facilitate biasing the orientation of the door link.

2. The mount of claim 1, wherein the biasing mechanism is coupled to stationary link and the cam is coupled to the lower link.

3. The mount of claim 2, wherein the cam is integrally formed with the lower link.

4. The mount of claim 1, wherein the stationary link in configured to fixedly coupled to the gaming console at two or more mounting points, and wherein the door link is configured to fixedly couple to the door at two or more mounting points.

5. The mount of claim 4, wherein the door link is selectively moveable relative to the stationary link between a closed position, in which the door link is positioned adjacent the stationary link, and an opened position, in which the door link is positioned laterally away from the door link.

6. The mount of claim 5, wherein the door link is configured to remain substantially parallel to the stationary link as the door link is moved between the opened position and the closed position.

7. The mount of claim 5, wherein the upper link and the lower link are configured to remain substantially parallel to one another as the door link is moved between the opened position and the closed position.

8. The mount of claim 5, wherein the arm engages the cam surface at a first circumferential position on the cam surface when the door link is in the closed position, the arm engaging the cam surface at a second, different, circumferential position when the door link is in the opened position, wherein the cam surface has a substantially constant arch between the first circumferential position and the second circumferential position.

9. The mount of claim 8, wherein the cam surface includes a stop adjacent the second circumferential position.

10. The mount of claim 5, wherein, when the door link is in the opened position, the door link is raised relative to the stationary link and at least one of the lower link and the upper link is oriented obliquely relative to the door link.

11. The mount of claim 10, wherein the biasing mechanism is configured to bias the door link toward the opened position.

12. The mount of claim 1, wherein the door link is coupled to a monitor for the gaming console.

13. The mount of claim 1, wherein the door link is a monitor for the gaming console.

14. The mount of claim 1, wherein the biasing mechanism is a torsion spring.

15. The mount of claim 1, wherein the door link is vertical.

16. A gaming console, comprising:
  a cabinet enclosing a processor and a non-transitory memory storing instructions for execution of an electronic game of chance;
  a door providing access to an interior of the cabinet; and
  at least one mount securing the door to the cabinet, the at least one mount comprising:
    a four-link mechanism having a stationary link configured to be fixedly coupled to the gaming cabinet, a door link positioned opposite the stationary link and configured to be fixedly coupled to the door, an upper link rotatably coupled to the stationary link and the door link, and a lower link rotatably coupled to the stationary link and the door link;
    a cam coupled to at least one link of the four link mechanism, the cam comprising an arcuate cam surface;
    a biasing mechanism coupled to a link adjacent the at least one link; and
    an arm coupled to the biasing mechanism and extending radially outward therefrom, the arm configured for rotation with the biasing mechanism and positioned to engage the arcuate cam surface to facilitate biasing the orientation of the door link.

17. The gaming console of claim 16, wherein the biasing mechanism is coupled to stationary link and the cam is coupled to the lower link.

18. The gaming console of claim 17, wherein the cam is integrally formed with the lower link.

19. The gaming console of claim 16, wherein the stationary link is configured to fixedly coupled to the gaming cabinet at two or more mounting points, and wherein the door link is configured to fixedly couple to the door at two or more mounting points.

20. The gaming console of claim 19, wherein the door link is selectively moveable relative to the stationary link between a closed position, in which the door link is positioned adjacent the stationary link, and an opened position, in which the door link is positioned laterally away from the door link.

* * * * *